US010754441B2

(12) United States Patent
Montaldi et al.

(10) Patent No.: US 10,754,441 B2
(45) Date of Patent: Aug. 25, 2020

(54) TEXT INPUT SYSTEM USING EVIDENCE FROM CORRECTIONS

(71) Applicant: Microsoft Technology Licensing, LLC, Redmond, WA (US)

(72) Inventors: Marisa Clare Montaldi, London (GB); Joseph Osborne, London (GB); Richard David Tunnicliffe, London (GB); Jessica Margaret Pumphrey, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 15/498,238

(22) Filed: Apr. 26, 2017

(65) Prior Publication Data

US 2018/0314343 A1    Nov. 1, 2018

(51) Int. Cl.
| | | |
|---|---|---|
| *G06F 17/27* | (2006.01) | |
| *G06F 3/023* | (2006.01) | |
| *G06F 3/0488* | (2013.01) | |
| *G06F 40/274* | (2020.01) | |
| *G10L 15/183* | (2013.01) | |

(52) U.S. Cl.
CPC ........ *G06F 3/0237* (2013.01); *G06F 3/04886* (2013.01); *G06F 40/274* (2020.01); *G10L 15/183* (2013.01)

(58) Field of Classification Search
CPC ...................................................... G06F 17/27
USPC .......... 704/235, 500, 8, 10, 9; 715/261, 773, 715/256, 255, 257; 707/769, 767
See application file for complete search history.

(56) References Cited

U.S. PATENT DOCUMENTS

| | | | |
|---|---|---|---|
| 6,286,064 B1 | 9/2001 | King et al. | |
| 7,680,649 B2 | 3/2010 | Park | |
| 8,266,528 B1* | 9/2012 | Hayes | G06F 3/0237 715/256 |
| 8,868,592 B1* | 10/2014 | Weininger | G06F 16/3322 707/767 |
| 2011/0066634 A1* | 3/2011 | Phillips | G10L 15/22 707/769 |
| 2011/0219299 A1* | 9/2011 | Scalosub | G06F 40/274 715/261 |
| 2012/0310626 A1* | 12/2012 | Kida | G06F 40/232 704/8 |

(Continued)

OTHER PUBLICATIONS

Kristensson, Per Ola, "Five Challenges for Intelligent Text Entry Methods", In AI Magazine, vol. 30, No. 4, Sep. 18, 2009, pp. 85-94.

*Primary Examiner* — Michael Colucci

(57) ABSTRACT

A text input system is described for inputting text to a computing device. The text input system has a memory storing first evidence comprising text selected by a user for input to the computing device in a first attempt by a user to input intended text. The memory stores second evidence comprising either information about text deleted by the user or text selected by the user in a second attempt at inputting the intended text. The text input system has an input model configured to combine at least the first and second evidence to produce combined evidence; and a text predictor configured to take the combined evidence as input and use the combined evidence to compute a plurality of predicted text items for input to the computing device.

20 Claims, 11 Drawing Sheets

(56) References Cited

U.S. PATENT DOCUMENTS

| | | | |
|---|---|---|---|
| 2013/0246329 A1* | 9/2013 | Pasquero | G06N 20/00 |
| | | | 706/52 |
| 2014/0002363 A1* | 1/2014 | Griffin | G06F 3/04886 |
| | | | 345/168 |
| 2014/0267045 A1 | 9/2014 | Grieves et al. | |
| 2014/0278349 A1* | 9/2014 | Grieves | G06F 40/242 |
| | | | 704/8 |
| 2015/0012867 A1* | 1/2015 | Yoon | G06F 40/232 |
| | | | 715/773 |
| 2015/0121285 A1 | 4/2015 | Eleftheriou et al. | |
| 2015/0235641 A1* | 8/2015 | VanBlon | G10L 15/24 |
| | | | 704/235 |
| 2015/0347383 A1 | 12/2015 | Willmore et al. | |
| 2016/0253299 A1 | 9/2016 | Mese et al. | |
| 2016/0282956 A1* | 9/2016 | Ouyang | G06F 40/00 |
| 2016/0357730 A1 | 12/2016 | Eberbach | |
| 2017/0168711 A1* | 6/2017 | Temple | G06F 3/04886 |
| 2017/0185581 A1* | 6/2017 | Bojja | G06F 40/242 |
| 2017/0220567 A1* | 8/2017 | Masson | G06F 40/274 |
| 2018/0089308 A1* | 3/2018 | Barsness | H04W 4/90 |

\* cited by examiner

TEXT INPUT SYSTEM USING EVIDENCE FROM CORRECTIONS

BACKGROUND

Text input system such as predictive virtual keyboards, predictive speech input systems and others are increasingly used to enter information into electronic devices and computing systems. Where electronic devices have a small form factor it can be burdensome for users to manually type in text using virtual keyboards. Where speech input is difficult due to background environment noise and/or the need to avoid disturbing others it is difficult to speak individual data items for input. Often mistakes are made in the text input process such as when a user manually presses the wrong keys or speaks indistinctly when spelling out a word.

Text input systems which use predictive technology to predict candidate next text input items are increasingly available. These include predictive virtual keyboards and other text input systems which offer candidate next text items, such as words, phrases, sentences, emoji, images, stickers, emoticons and others for the user to select. The user can then give a single input action such as a speech input, touch input or other modality of input to input the candidate text item.

Text input systems using predictive technology typically autocomplete or autocorrect text items using the predicted candidates. This leads to problems where the end result is not what the user intended. In that case the user has increased work and burden to correct the autocompleted or autocorrected text items and then to manually correctly enter the intended text item.

The embodiments described below are not limited to implementations which solve any or all of the disadvantages of known text input systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A text input system is described for inputting text to a computing device. The text input system has a memory storing first evidence comprising text selected by a user for input to the computing device in a first attempt by a user to input intended text. The memory stores second evidence comprising either information about text deleted by the user or text selected by the user in a second attempt at inputting the intended text. The text input system has an input model configured to combine at least the first and second evidence to produce combined evidence; and a text predictor configured to take the combined evidence as input and use the combined evidence to compute a plurality of predicted text items for input to the computing device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Although the present examples are described and illustrated herein as being implemented in a virtual keyboard text entry system, the system described is provided as an example and not a limitation. As those skilled in the art will appreciate, the present examples are suitable for application in a variety of different types of text input systems including but not limited to: browsers, e-readers, document authoring applications, predictive keyboards and others. Data may be input using any modality including speech, touch, gesture, pointing and others.

The present technology comprises a text input system 108 where the user is able to more efficiently correct text which has been input to a computing device. Text is said to be correct when it is as the user intends. This reduces the burden of manually inputting text to the computing device. The resources of the computing device are also conserved since text input uses resources of a computing device including power and memory resources in order to detect, interpret and store user input.

A corrective action is any operation acting to edit or delete text which has been selected for input into the computing device, or which has already been input to the computing device. A non-exhaustive list of examples of corrective action is: selection of a backspace key which is either a physical key or is a key displayed on a touch screen, a voice command acting to edit or delete a text item, a gesture acting to edit or delete a text item, use of an eraser tip of a stylus.

Figure 1:
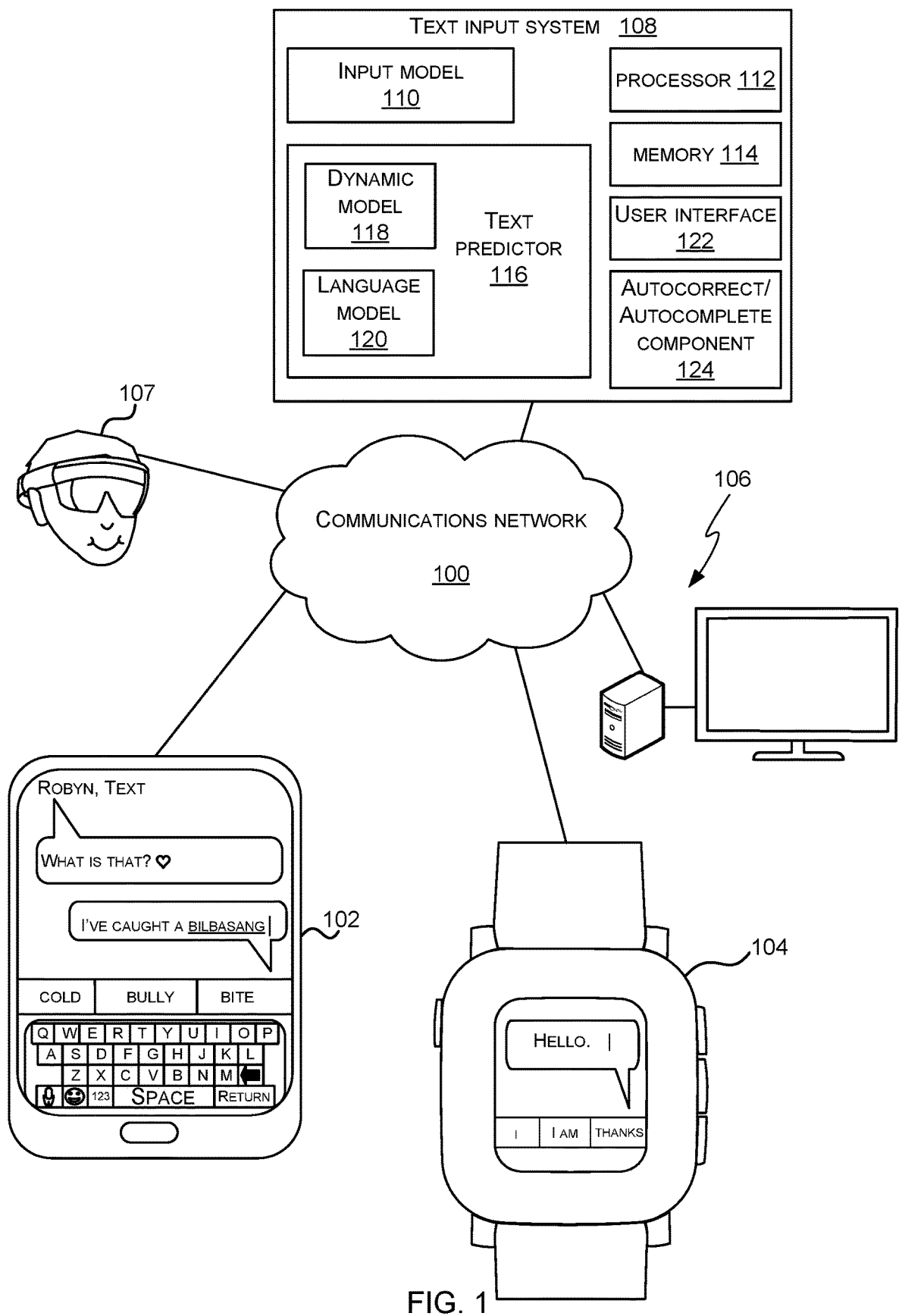
FIG. 1 is a schematic diagram of a text input system and various computing devices.

FIG. 1 is a schematic diagram of a smart phone 102 with a virtual keyboard, a smart watch 104 with a virtual keyboard, a desktop computing device 106 and an augmented reality computing device 107. The augmented reality computing device 107 displays a virtual keyboard to the user and the user is able to select keys of the virtual keyboard using eye movements, finger pointing, speech commands or in other ways. The desktop computing device 106 has text authoring software which enables a user to input and edit text. The term "key press" is used to refer to an event where a physical or graphically represented key denoting a text item is selected by a user using any method of selection such as eye movements, finger pointing, touch, voice command or other method of selection.

The smart phone 102, smart watch 104, desktop computing device 106 and augmented reality computing device 107 are examples of electronic devices where text input systems are used although other electronic devices may be used with the technology described herein. Each of the electronic devices 102, 104, 106, 107 either comprises a text input system 108 or has access to a text input system 108 via a communications network 100.

The text input system 108 comprises text predictor 116 technology such as one or more n-gram language models, neural network language models, or other language model(s) 120. A language model is a description of a language which is able to generate text. In some cases the text predictor 116 comprises a dynamic language model 118 which is bespoke to a user of the text input system however it is not essential to include a dynamic model 118. The text input system 108 comprises an input model 110, at least one processor 112 and a memory 114 as described in more detail with reference to FIG. 8 below. The text input system has a user interface 122 capable of receiving text items selected by a user and offering candidate text items to a user for input to a computing device. The text input system 108 has an autocorrect/autocomplete component 124 which is functionality for automatically correcting and/or completing text using predictions from the text predictor 116.

The input model 110 is computer-implemented functionality which computes the probability of a text item the user is trying to select, given evidence about user input events (such as key presses). The input model is domain-specific in some cases such as being for typing user input on a virtual keyboard, or for speech input on a speech interface. The input model may take into account the layout of any keyboard involved. It may take into account information about particular sensors used or types or model of electronic device 102, 104, 106, 107. The observed user input may be a mis-spelled or redacted or mis-typed version of the true intended text item. In some cases the observed user input comprises key press data such as one or more coordinates of user input events associated with a touch screen or augmented reality display, and probability values associated with the individual key press data items. In some cases the observed user input comprises handwriting or a speech audio signal or speech audio features. In some cases the input model is user specific in that it takes into account user input behavior of a particular user. In some cases the input model is specific to a group of users, such as left handed users, or speakers with a particular accent.

Alternatively, or in addition, the functionality of the text input system 108 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The functionality of the text input system 108 may be shared between a computing device 102, 104, 106 and a text input system 108 in the cloud in some examples. The text input system 108 is implemented using one or more of: software, hardware, firmware.

Using the text input system 108 the user is able to more efficiently correct text which has been input to a computing device. This is achieved by using an input model 110 which, in the case the user makes a deletion, uses evidence about the deletion, to compute probabilities of a text item the user is trying to select. This probability data is then input to the text predictor which uses it to compute text predictions which take into account data about the deletion. The text predictions are offered to the user for input or are used for autocorrection and/or autocompletion. In some examples the evidence about the deletion comprises autocorrected or autocompleted text which is deleted by a user. In some examples the evidence about the deletion comprises key press data of text selected by a user and later deleted by the user.

The present technology enables a more efficient way of inputting text which gives reduced burden on the user and/or reduced burden on resources of the computing device.

Figure 2A:
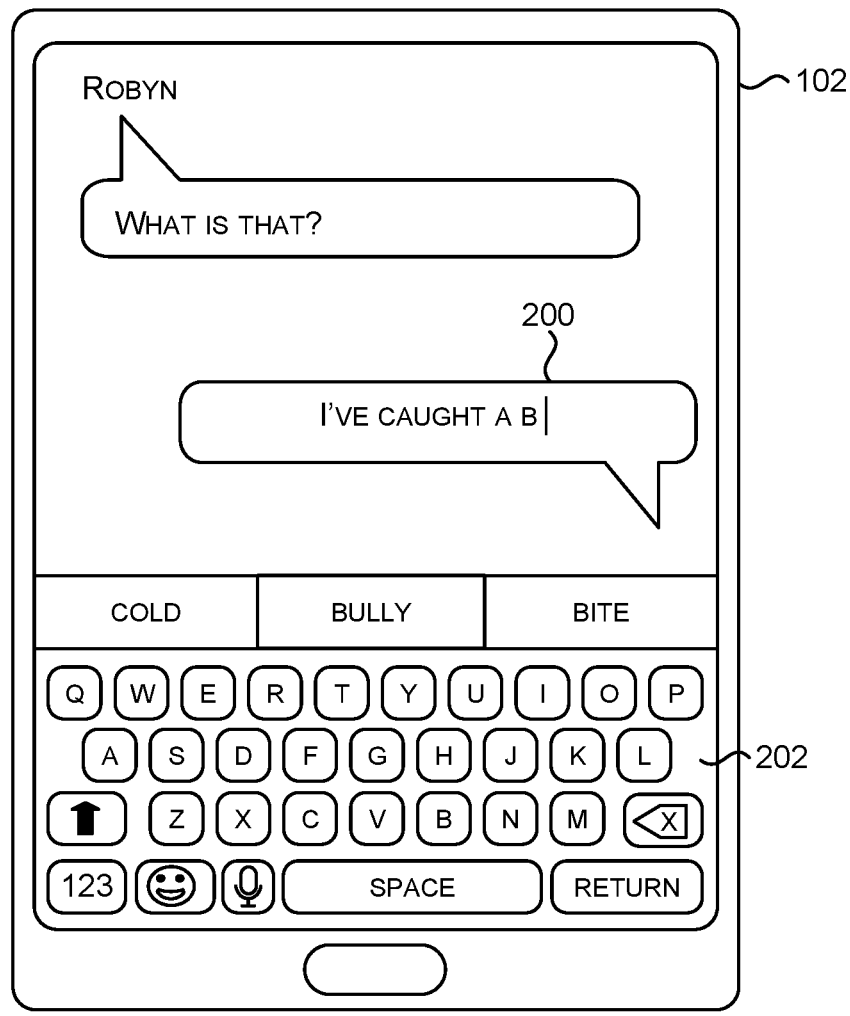
FIGS. 2A to 2B show a smart phone with a soft predictive keyboard being used to input text to the smart phone, and where a user is taking action to correct text.
Figure 2B:
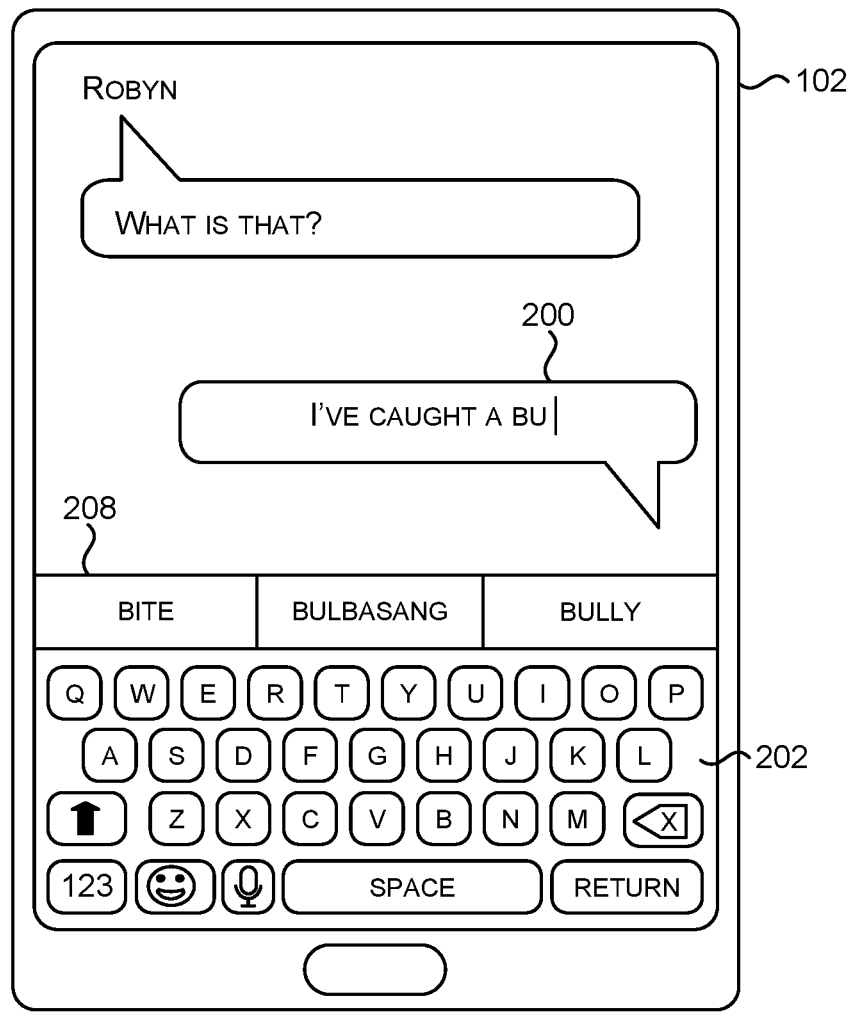

FIGS. 2A and 2B, together with the smart phone 102 of FIG. 1 illustrate how the present technology aids a user when correcting text. In FIG. 1 the smart phone 102 shows a text message received from Robyn and where the text message says "What is that?" and has a heart shaped emoji. The user of smart phone 102 is composing a reply using a predictive virtual keyboard 202 on a touch screen of the smart phone 102. The user has so far entered "I've caught a" and is intending to type in the word "bulbasang" which is a noun that is outside the vocabulary of the text input system 108. The user is not offered a candidate prediction for "bulbasang" because it is an out of vocabulary word and so the user has to type in each individual letter one by one. The user makes a typing error and selects the keys "bilbasang" rather than "bulbasang".

As illustrated in FIG. 2A the user notices the typing error and uses the backspace key to delete "ilbasang" leaving "I've caught a b" in the message 200 being composed. The text input system 108 stores in memory 114 evidence (such as key press data) about the originally selected text which is deleted i.e. "ilbasang" in this case.

As illustrated in FIG. 2B the user proceeds to select the key "u" and the text input system 108 computes candidate predictions and offers these to the user at candidate keys 208 of the predictive virtual keyboard 202. In this case the candidates are "bite", "bulbasang" and "bully" with the most likely candidate being placed in the center as illustrated in FIG. 2B. Because the text input system 108 has been able to take into account the evidence about the deleted text "ilbasang" it is able to compute "bulbasang" as a high probability candidate, even though "bulbasang" is an out of vocabulary word. The user now proceeds to select the candidate key for "bulbasang" and as a result "bulbasang" is entered into the smart phone. In addition the dynamic model 118 is updated to include "bulbasang".

Previous predictive keyboards are unable to offer "bulbasang" as a candidate in the situation of FIG. 2B. Thus the user is saved significant work having to manually enter "bulbasang" letter by letter as is the case in previous systems. In addition, computing resources such as battery power are saved since each operation of detecting a user input event, interpreting it and operating the text input system 108 uses resources.

In the example illustrated with respect to FIG. 1 and FIGS. 2A to 2B no autocorrection or autocompletion of text is involved. Another example where autocorrection or autocompletion of text does occur is now given with respect to FIGS. 2C to 2D.

Figure 2C:
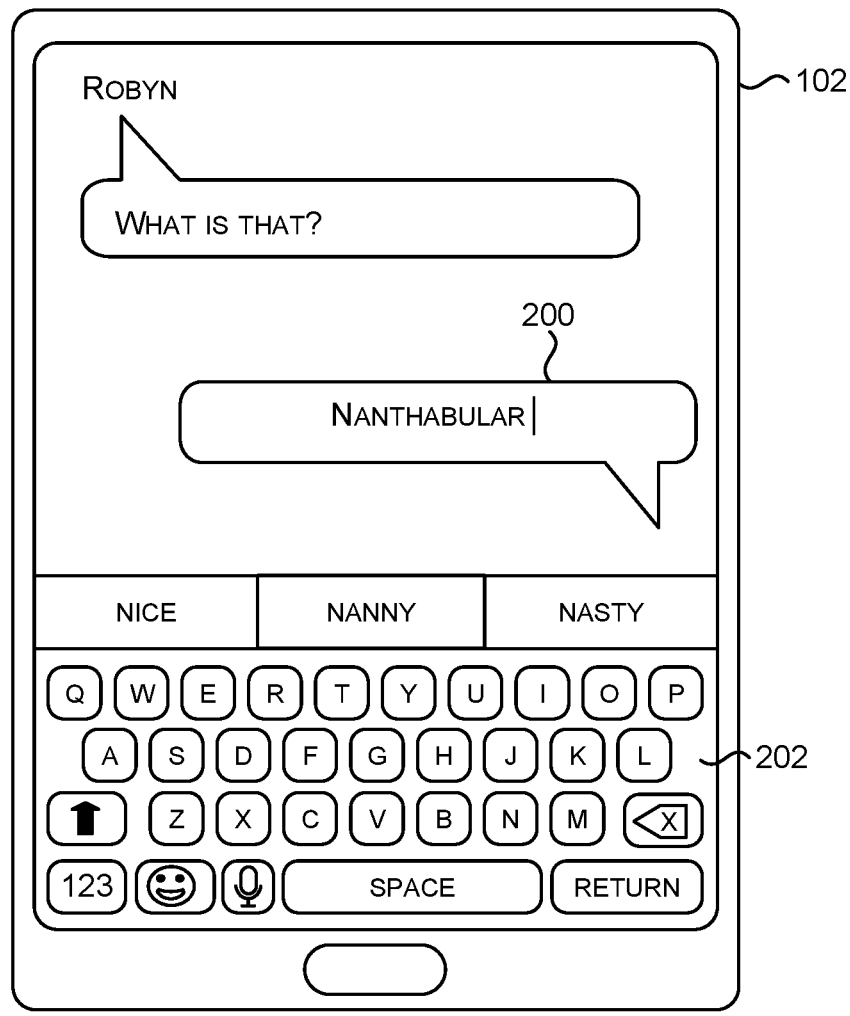
FIGS. 2C to 2D show a smart phone with a soft predictive keyboard being used to input text to the smart phone, in another example where a user is taking action to correct text, and where autocorrection has taken place in a manner which is not as the user intended.
Figure 2D:
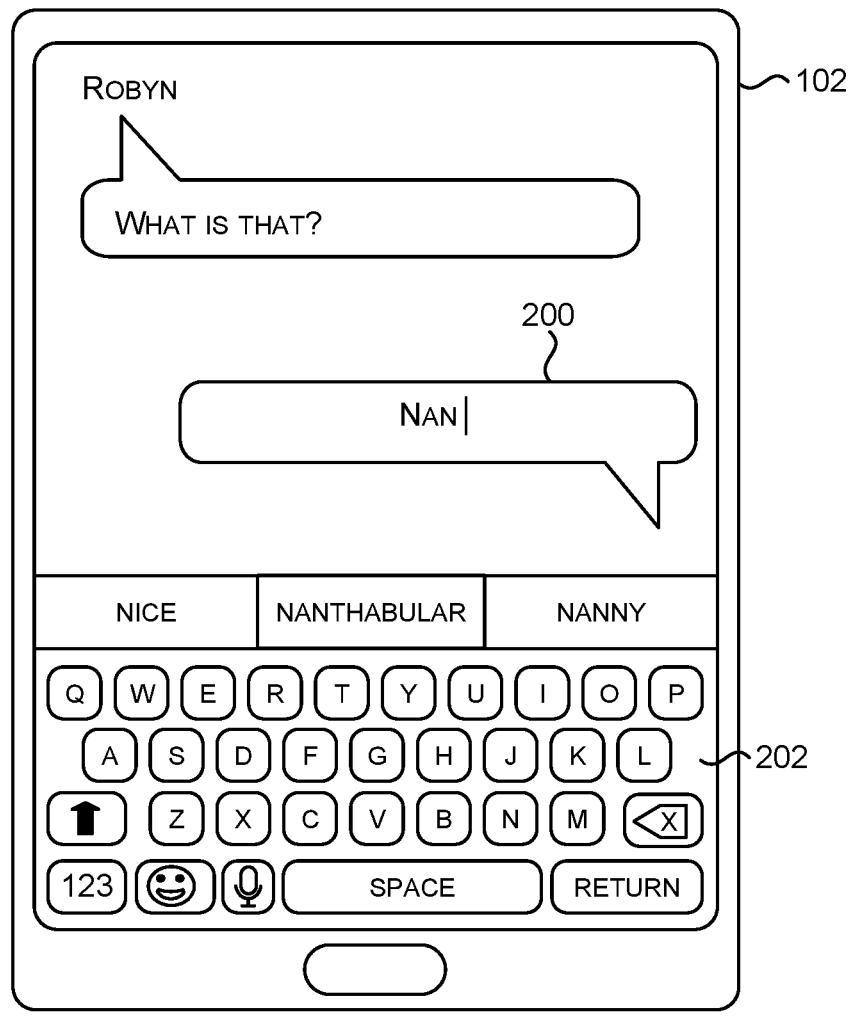

The user wants to type "nanthabular" and enters it correctly as shown in FIG. 2C. The text input system 108 does not recognize "nanthabular" and corrects it to "nanny" which is the candidate word with the highest probability computed by the text input system given "nanthabular" as input. The user is unhappy with the autocorrection to "nanny" and begins backspacing until the common prefix "nan" of the two words "nanny" and "nanthabular" is left in message 200 as illustrated in FIG. 2D. While the common prefix "nan" is present in message 200 the system offers the originally entered text "nanthabular" as a candidate as illustrated in FIG. 2D. The user then selects the candidate "nanthabular" and this word is entered successfully.

Figure 3A:
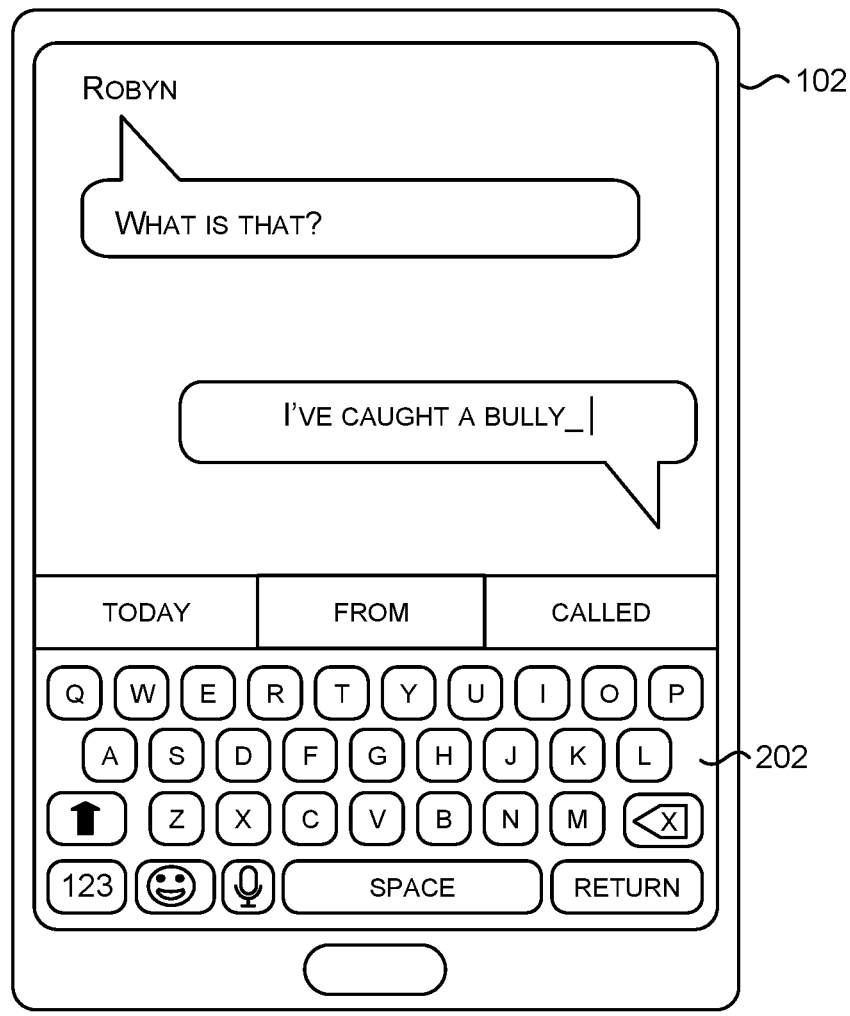
FIGS. 3A to 3B show a smart phone with a soft predictive keyboard being used to input text to the smart phone and where autocorrection has taken place in a manner which is not as the user intended.
Figure 3B:
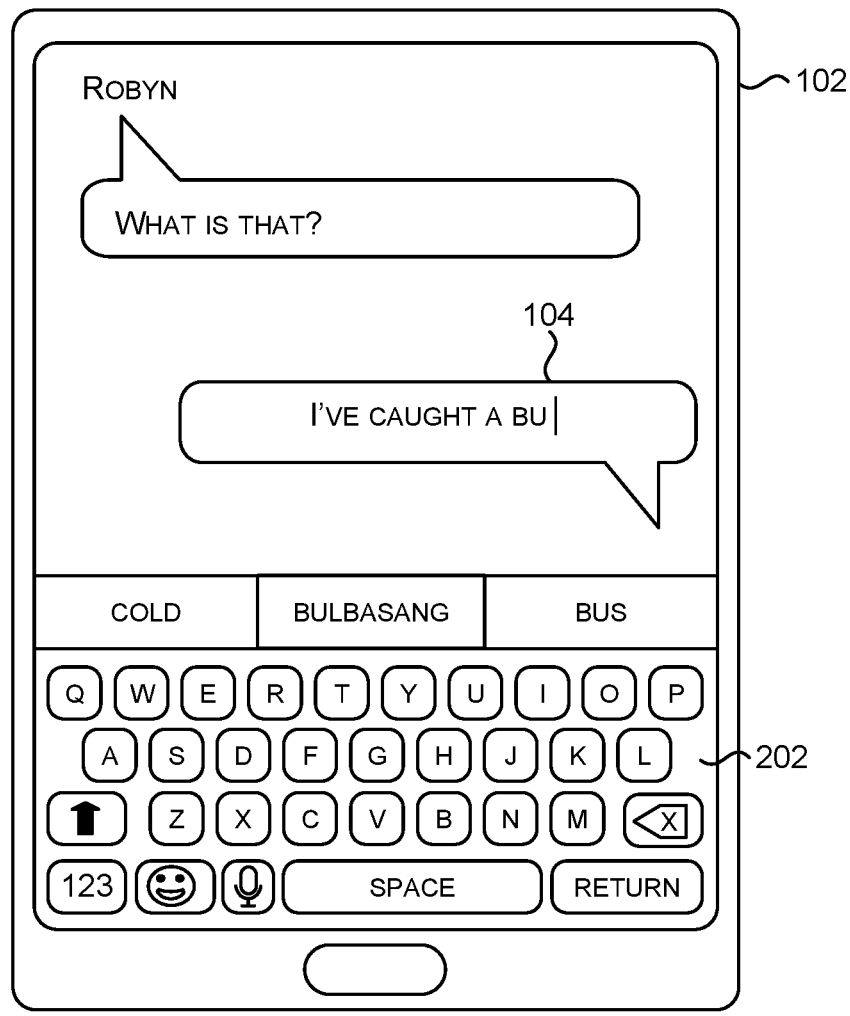

Another example is now given with respect to FIGS. 1 and 3A to 3B where autocompletion occurs. This example also applies to the case of autocorrection.

Suppose the actions described with reference to FIGS. 2A and 2B have occurred so that "bulbasang" is now in the dynamic model 118. The user is then again in the situation of FIG. 1 and is intending to input "bulbasang". The user makes a typing error and enters "bilbasang" and the candidates offered at this point are "cold", "bully" and "bite". The candidate with the highest probability as computed by the text predictor 116 is "bully" and when the user enters a space after "bilbasang" the autocorrection/autocompletion component 124 autocorrects "bilbasang" to "bully" as illustrated in FIG. 3A.

The user is intending to input "bulbasang" and so the user takes corrective action and deletes "lly" leaving "I've caught a bu" in the message being composed as indicated in FIG. 3B. At this point the text input system 108 has evidence about the deletion comprising both evidence about "lly" which is text from an autocorrection which is later deleted, and evidence about "bu" which is the text of the autocorrection which remains after the deletion. The text input system 108 uses the evidence about the deletion (i.e. the autocorrected text "lly" which was deleted and the autocorrected text "bu" which remains) together with evidence of "bilbasang" which was the originally selected text. The input model 110 combines the evidence and inputs it to text predictor 116 so that the text predictor is able to compute "cold", "bulbasang" and "bus" as candidates for next words, where "bulbasang" is the candidate with the highest computed probability.

In another example, the user is intending to input "bully" but instead types "byllt". The text input system 108 corrects this to "billy" which is unwanted. The user deletes "illy" and enters "u" to make "bu". The text input system now takes into account the evidence from the deletion which comprises deleted characters "i", "l", "l", "y" as well the remaining text after the deletion "b", and it takes into account the newly entered text "u", and the original evidence of the selected characters "byllt". Combining the sources of evidence it is able to generate candidates including "bully" the desired word.

Figure 4:
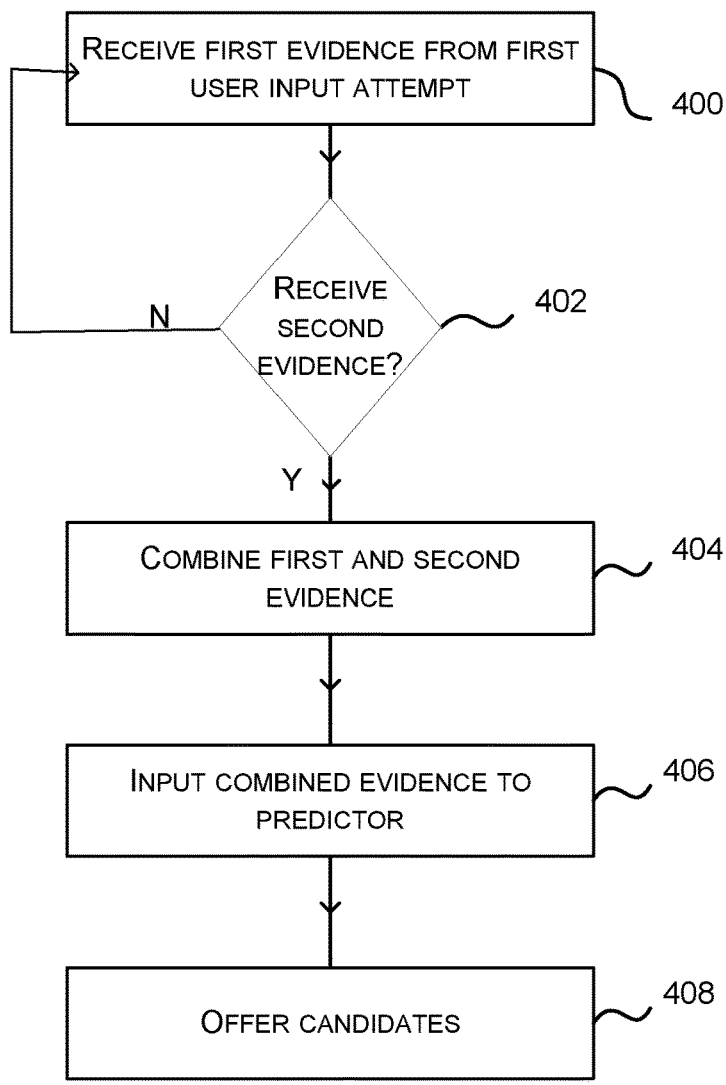
FIG. 4 is a flow diagram of a method of operation at a text input system such as that of FIG. 1.

FIG. 4 is a flow diagram of a computer implemented method of operation at a text input system 108 such as that of FIG. 1. A user makes a first attempt an inputting text and the text input system receives 400 first evidence about the first attempt. For example, the evidence comprises key press data.

The first attempt is unsuccessful in that the result is not text which the user intended to input. In some cases autocorrection or autocompletion has occurred but this is not essential. The user makes a corrective action such as a deletion which is detected by the text input system 108.

The text input system receives 402 second evidence. The second evidence is about the deletion, for example, it comprises information about autocorrected/autocompleted text which is deleted. In another example, it comprises information about which of the originally selected text is deleted. In some cases the second evidence is evidence about new text selected by the user for input.

The text input system 108 combines 404 the first and second evidence. For example, an input model 110 does the combining as explained in more detail below. The combining process may comprise a weighted aggregation in some cases.

The text input system inputs 406 the combined evidence to the text predictor 116 which computes candidate text items. The candidate text items are used in one or more ways such as for one or more of: offering 408 to a user for input, autocompletion, autocorrection.

Figure 5:
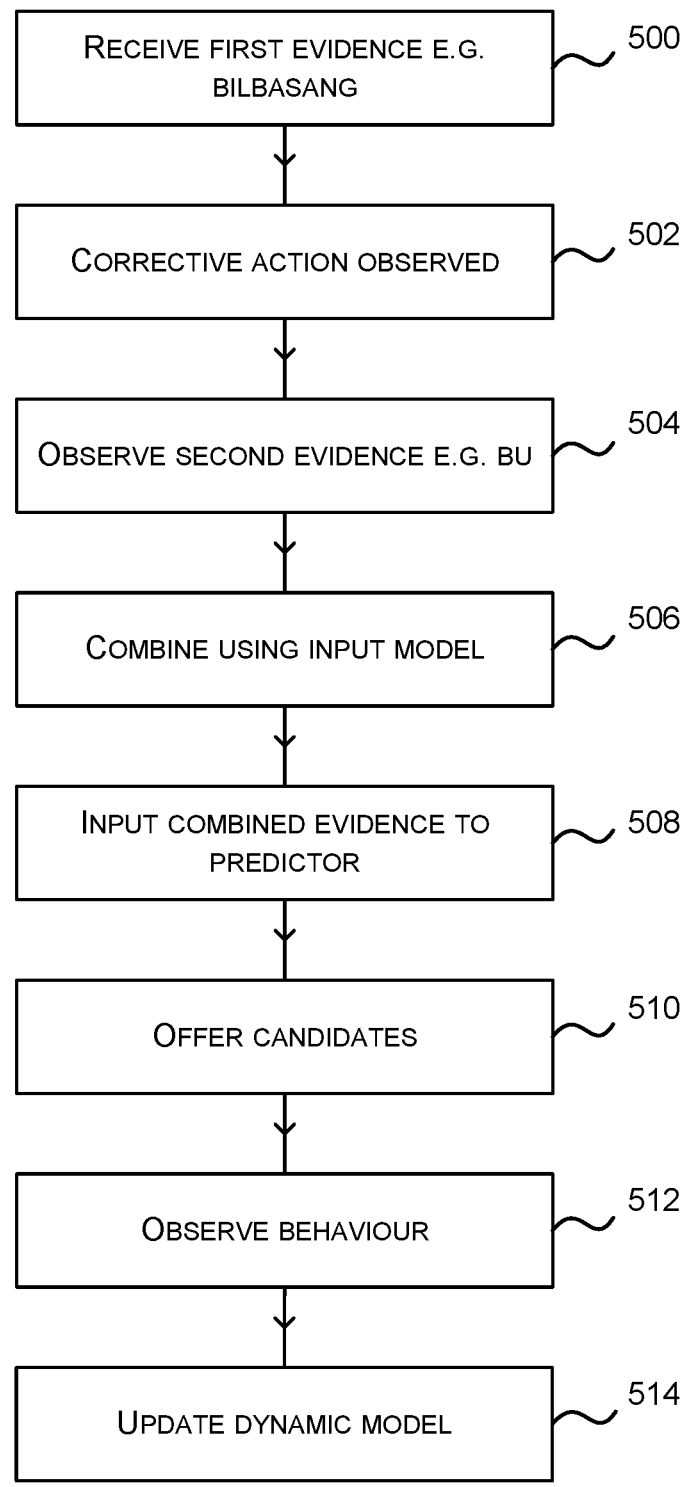
FIG. 5 is a flow diagram of an example of the method of FIG. 4 in more detail.

FIG. 5 is a flow diagram of an example of the method of FIG. 4 in a case with no autocorrection and with no autocompletion. The text input system 108 receives 500 first evidence comprising key press data or other evidence about user input events selecting text for input. For example, the first evidence is key press data comprising coordinates of a key on the virtual keyboard and an associated probability value, for each of "b", "i", "1", "b", "a", "s", "a", "n", "g". The coordinates are received from an operating system of the computing device in some examples, or are computed by the input model 110. The probability values are computed by the input model 110.

The text input system 108 detects 502 a corrective action such as operation of a backspace key or a voice command for deleting text. It stores information about the deletion such as the fact that the letters "ilbasang" were deleted.

The text input system 108, observes 504 second evidence. In this case, the second evidence is evidence about new text selected by the user for input. For example, in the situation of FIG. 2B the second evidence is key press data about a user input event where the user selects the key denoting "u". Thus the second evidence may comprise coordinates and a probability value associated with "u". Because this is a second attempt at inputting text on the part of the user, the input model 110 assigns a higher probability to the new text as it is assumed that the user is being more careful in the second attempt than in the first attempt.

The input model combines 506 the first and second evidence. For example, the input model assumes that the number of letters in the originally selected text is correct and for each letter position in the originally selected text, it determines a letter by selecting a letter in that position with the highest key press probability. In this way it combines the first evidence which is the key press evidence for "bilbasang" with key press evidence for "u" in the second letter position, to give key press evidence for "bulbasang".

The resulting key press evidence for "bulbasang" is input 508 to the text predictor which computes "bulbasang" as the most probable candidate since even though this is an out of vocabulary word, it is treated as text selected by the user and the other candidates which are computed are of low confidence with respect to a threshold, since bulbasang is an unusual word which is dissimilar to other words in the vocabulary of the text input system 108.

The most probable candidate and one or more other candidates are offered 510 to the user for input to the computing device in some cases. In some cases the most probable candidate is used for autocompletion or autocorrection.

The text input system 108 observes behavior and if the candidate "bulbasang" is selected by the user or accepted as a result of autocompletion or autocorrection by the user, then the text input system updates the dynamic model to include "bulbasang".

Figure 6:
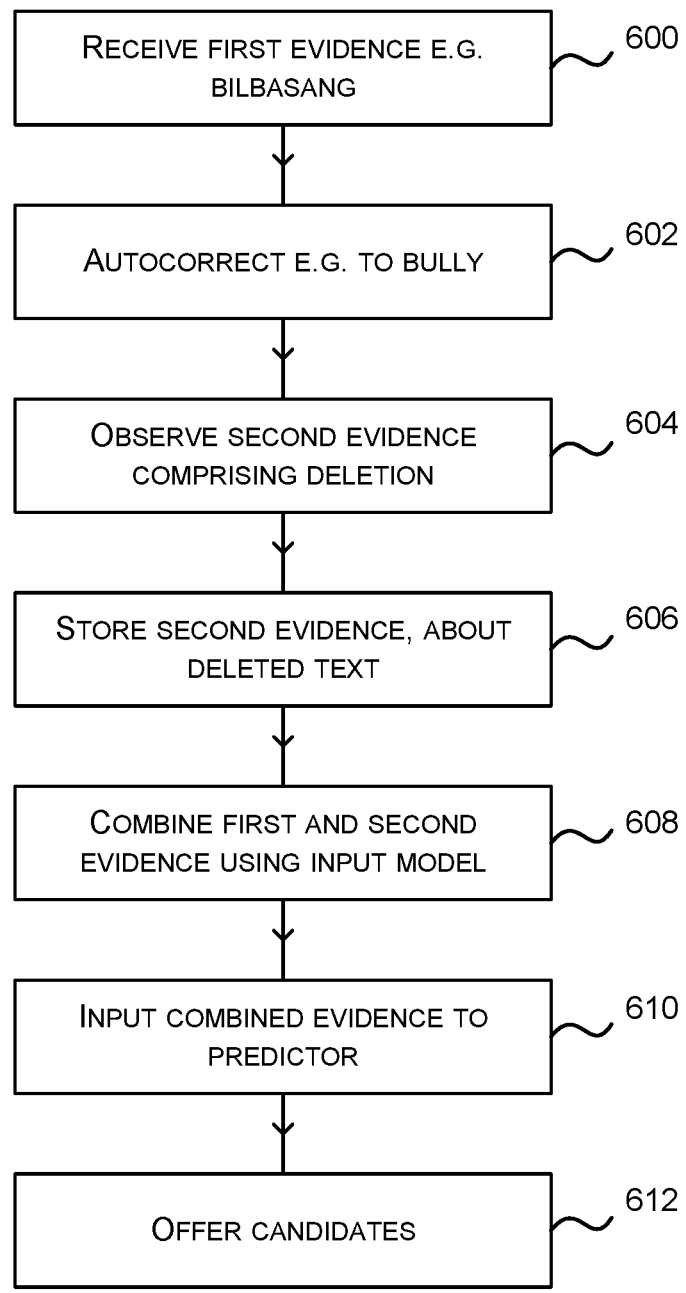
FIG. 6 is a flow diagram of another example of the method of FIG. 4 in a case where autocorrection has taken place.

FIG. 6 is a flow diagram of an example of a method of operation at the text input system 108 in the case that autocorrection or autocompletion occurs. In this case the text input system receives 600 first evidence of a first input attempt by a user. For example, the first evidence is key press data for "bilbasang". The first evidence is input to the input model which computes a representation of "bilbasang" which is input to the text predictor. The text predictor computes candidate text items and these include "bully" as the candidate with the highest probability since at this point "bulbasang" is not in the vocabulary of the text predictor.

The text input system 108 autocorrects "bilbasang" to "bully" since "bully" is the candidate prediction with the highest probability. The user is intending to input "bulbasang" and so the user begins to delete "bully" using the backspace key until the cursor or other input position indicator is adjacent the point of the first error. The deletion is observed 604 by the text input system 108 and second evidence is obtained. The second evidence in this case is the evidence of the autocorrected text which is deleted "lly" and the evidence of the autocorrected text which is left "bu".

The input model 110 combines 608 the first and second evidence. For example, the first evidence is key press evidence about "bilbasang" and the second evidence comprises the fact that letters "lly" were deleted from "bully" and that the letters "bu" were not deleted. The input model 110 converts the key press evidence of the first evidence into the same form as the second evidence. Thus the key press evidence for "bilbasang" is converted into the letters "bilbasang". The letters of the second evidence are given greater weight or certainty than the letters of the first evidence, as the user is assumed to be more careful when making the deletion than when inputting the text at operation 600. The input model combines the letters from the first evidence with the letters of the second evidence by replacing the letters of the first evidence by corresponding letters of the second evidence. For example, the combined evidence comprises the letters "bulbasang".

The text input system 108 inputs 610 the letters "bulbasang" into the text predictor which computes predicted words as a result. Even though "bulbasang" is not in the vocabulary of the text predictor the text predictor computes "bulbasang" as output since this is identical to the input and there are no other high probability candidates computed by the text predictor since "bulbasang" is an unusual word.

The text input system 108 offers 612 the candidates to the user for input to the computing device in some cases. In some cases the candidate(s) are used for autocompletion or autocorrection.

Figure 7:
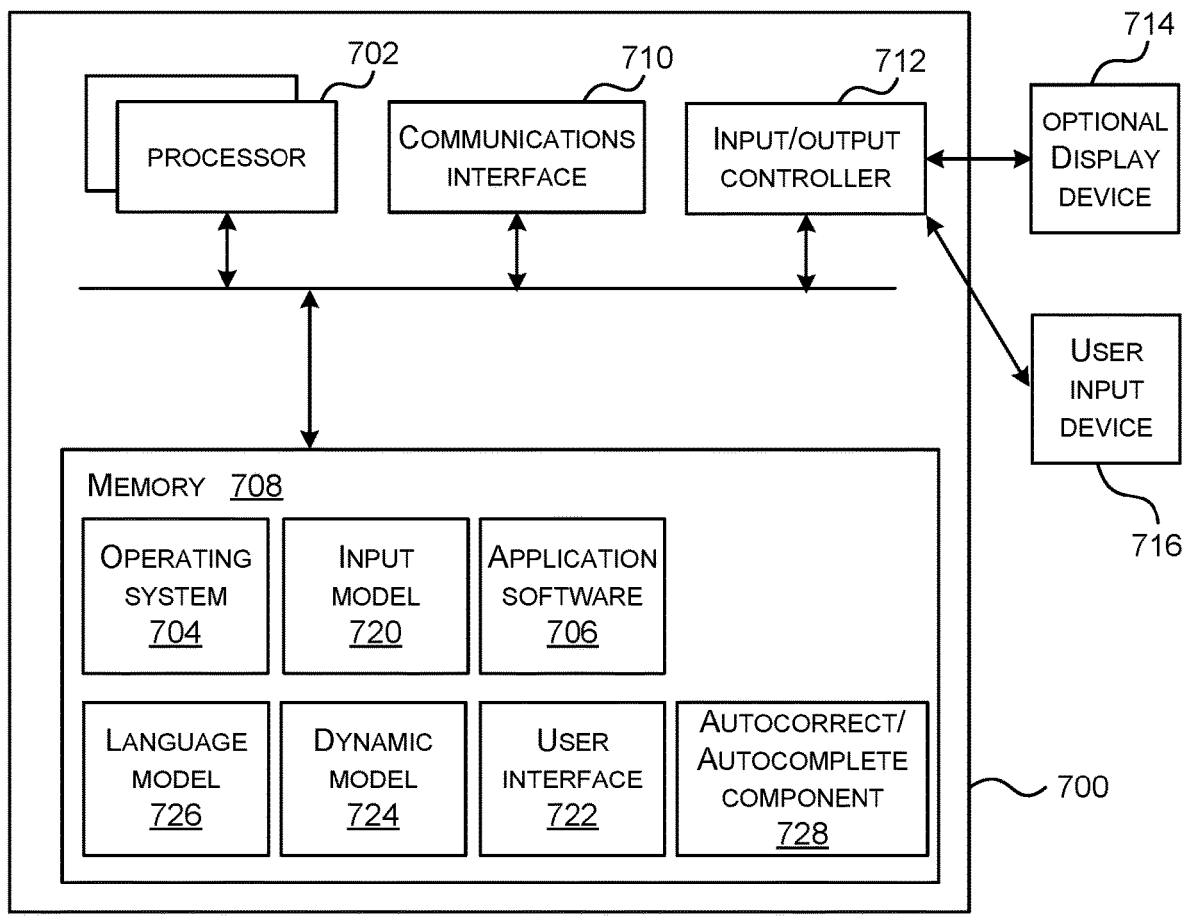
FIG. 7 illustrates an exemplary computing-based device in which embodiments of a text input system are implemented.

FIG. 7 illustrates various components of an exemplary computing-based device 700 which are implemented as any form of a computing and/or electronic device, and in which embodiments of a text input system 108 are implemented in some examples.

Computing-based device 700 comprises one or more processors 702 which are microprocessors, controllers or any other suitable type of processors for processing computer executable instructions to control the operation of the device in order to facilitate text input to the computing-based device 700 where corrections are being made. In some examples, for example where a system on a chip architecture is used, the processors 702 include one or more fixed function blocks (also referred to as accelerators) which implement a part of the method of FIGS. 4 to 6 in hardware (rather than software or firmware). Platform software comprising an operating system 704 or any other suitable platform software is provided at the computing-based device to enable application software 706 to be executed on the device. The application software may comprise a messaging application, a content authoring application, an information retrieval application, a document reader, a web browser, or others where text is to be either input by the user or corrected by a user. The computing-based device 700 has an input model 720 as described herein, a language model 726, a user interface 722, an autocorrect/autocomplete component 728 and optionally a dynamic language model 726.

The computer executable instructions are provided using any computer-readable media that is accessible by computing based device 700. Computer-readable media includes, for example, computer storage media such as memory 708 and communications media. Computer storage media, such as memory 708, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 708) is shown within the computing-based device 700 it will be appreciated that the storage is, in some examples, distributed or located remotely and accessed via a network or other communication link (e.g. using communication interface 710 which is a network card, transceiver or other communication interface).

The computing-based device 700 also comprises an input/output controller 712 arranged to output display information to a display device 714 which may be separate from or integral to the computing-based device 700. The display information provides examples of use in an overlay panel, pop up window or in other ways. In some cases the display information provides a virtual keyboard and optionally other graphical user interfaces. The input/output controller 712 is also arranged to receive and process input from one or more devices, such as a user input device 716 (e.g. a mouse, keyboard, camera, microphone or other sensor). In some examples the user input device 716 detects voice input, user gestures or other user actions and provides a natural user interface (NUI). This user input may be used to delete text, to type text into the virtual keyboard, to select predicted candidate data items for entry, to give speech commands which select text items for which examples of use are sought and for other purposes. In an embodiment the display device 714 also acts as the user input device 716 if it is a touch sensitive display device. The input/output controller 712 outputs data to devices other than the display device in some examples, e.g. a locally connected printing device.

Any of the input/output controller 712, display device 714 and the user input device 716 may comprise natural user interface (NUI) technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A text input system for inputting text to a computing device, the text input system comprising:

a memory storing first evidence comprising text selected by a user for input to the computing device in a first attempt by a user to input intended text;

the memory storing second evidence comprising either information about text deleted by the user or text selected by the user in a second attempt at inputting the intended text;

an input model configured to combine at least the first and second evidence to produce combined evidence; and a text predictor configured to take the combined evidence as input and use the combined evidence to compute a plurality of predicted text items for input to the computing device.

The text input system described above wherein the first evidence comprises a plurality of text items and probability values associated with individual ones of the text items.

The text input system described above wherein the first evidence comprises key press data about text keys selected by a user.

The text input system described above comprising a processor configured to check for autocorrected or autocompleted text which is deleted by the user, and if such a deletion occurs to store second evidence in the memory, where the second evidence comprises the autocorrected or autocompleted text which is deleted by the user.

The text input system described above, comprising a processor configured to check for deletion of at least part of the text selected by the user, and if such a deletion occurs, to store second evidence comprising identifiers of text characters deleted by the user.

The text input system described above comprising a processor configured to observe the second evidence and store the second evidence in the memory, where the second evidence comprises key press data observed during selection of the text by the user in the second attempt at inputting the intended text.

The text input system described above wherein the processor assigns weights to the second evidence and wherein the input model is configured to aggregate the first and second evidence using the weights.

The text input system described above wherein the input model is configured to aggregate the first and second evidence on the basis of probability values associated with either or both of the first and second evidence.

The text input system described above wherein the combined evidence comprises an ordered list of text characters.

The text input system described above wherein the processor is configured to offer one or more of the predicted text items for input to the computing device.

A computer-implemented method for inputting text to a computing device, the method comprising:

storing, at a memory, first evidence comprising text selected by a user for input to the computing device in a first attempt by a user to input intended text;

storing, at the memory, second evidence comprising either information about text deleted by the user or text selected by the user in a second attempt at inputting the intended text;

combining at least the first and second evidence to produce combined evidence; and inputting the combined evidence to a text predictor to compute, using the combined evidence, a plurality of predicted text items for input to the computing device.

The computer-implemented method described above wherein the first evidence comprises a plurality of text items and probability values associated with individual ones of the text items.

The computer-implemented method described above wherein the first evidence comprises key press data about text keys selected by a user.

The computer-implemented method described above comprising checking for autocorrected or autocompleted text which is deleted by the user, and if such a deletion occurs to storing second evidence in the memory, where the second evidence comprises the autocorrected or autocompleted text which is deleted by the user.

The computer-implemented method described above comprising checking for deletion of at least part of the text selected by the user, and if such a deletion occurs, to storing second evidence comprising identifiers of text characters deleted by the user.

The computer-implemented method described above comprising observing the second evidence and storing the second evidence, where the second evidence comprises key press data observed during selection of the text by the user in the second attempt at inputting the intended text.

The computer-implemented method described above comprising assigning weights to the second evidence and aggregating the first and second evidence using the weights.

The computer-implemented method described above comprising aggregating the first and second evidence on the basis of probability values associated with either or both of the first and second evidence.

The computer-implemented method described above comprising offering one or more of the predicted text items for input to the computing device.

A text input system for inputting text to a computing device, the text input system comprising:

a memory storing key press evidence of text selected by a user for input to the computing device in a first attempt by a user to input intended text;

a processor which detects second evidence comprising either information about text deleted by the user or key press evidence of text selected by the user in a second attempt at inputting the intended text;

an input model configured to combine at least the first and second evidence to produce combined evidence; and a text predictor configured to take the combined evidence as input and use the combined evidence to compute a plurality of predicted text items for input to the computing device.

A text input apparatus comprising:

means for storing first evidence comprising text selected by a user for input to the computing device in a first attempt by a user to input intended text;

means for storing second evidence comprising either information about text deleted by the user or text selected by the user in a second attempt at inputting the intended text;

means for combining at least the first and second evidence to produce combined evidence; and means for inputting the combined evidence to a text predictor to compute, using the combined evidence, a plurality of predicted text items for input to the computing device.

For example, the memory 114, 708 is exemplary means for storing. For example, the processor 112 when encoded to perform the operations illustrated in at least part of FIGS. 5 and 6 constitutes exemplary means for combining and inputting.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A text input system for inputting text to a computing device, the text input system comprising:

one or more processors configured to monitor for autocorrected or autocompleted text that is deleted by the user;

memory storing first evidence comprising unrecognized text input to the computing device in a first attempt by the user to input intended text and also storing second evidence comprising the autocorrected or the autocompleted text that is deleted by the user;

an input model configured to combine at least the first and second evidence to produce combined evidence; and a text predictor configured to use the combined evidence to compute a plurality of predicted text items for input to the computing device and rank the plurality of predicted text items based, at least in part, on the autocorrected or the autocompleted text that was deleted by the user, wherein the plurality of predicted text items include the unrecognized text that the user input to the computing device.

2. The text input system of claim 1 wherein the first evidence comprises a plurality of text items and probability values associated with individual ones of the text items.

3. The text input system of claim 2 wherein the first evidence comprises key press data about text keys selected by a user.

4. The text input system of claim 1, further comprising a processor configured to check for deletion of at least part of the unrecognized text input by the user, and if such a deletion occurs, to store second evidence comprising identifiers of text characters deleted by the user.

5. The text input system of claim 1, further comprising a processor configured to observe the second evidence and store the second evidence in the memory, where the second evidence comprises key press data observed during selection of the text by the user in the second attempt at inputting the intended text.

6. The text input system of claim 1, wherein the processor assigns weights to the second evidence and wherein the input model is configured to aggregate the first and second evidence using the weights.

7. The text input system of claim 1, wherein the input model is configured to aggregate the first and second evidence on the basis of probability values associated with either or both of the first and second evidence.

8. The text input system of claim 1, wherein the combined evidence comprises an ordered list of text characters.

9. The text input system of claim 1, wherein the processor is configured to offer one or more of the predicted text items for input to the computing device.

10. A computer-implemented method for inputting text to a computing device, the method comprising:
storing, at a memory, first evidence comprising unrecognized text input by a user to the computing device in a first attempt by the user to input intended text;
storing, at the memory, second evidence comprising information about autocorrected or autocompleted text deleted by the user;
combining at least the first and second evidence to produce combined evidence;
determining, using the combined evidence, a plurality of predicted text items for input to the computing device, wherein the plurality of predicted text items comprise the unrecognized text input by the user along with at least one other text item;
ranking the plurality of predicted text items based, at least in part, on the autocorrected or the autocompleted text that was deleted by the user; and
presenting the ranked plurality of predicted text items, including the unrecognized text input by the user, as autocorrection options.

11. The computer-implemented method of claim 10, wherein the first evidence comprises a plurality of text items and probability values associated with individual ones of the text items.

12. The computer-implemented method of claim 11, wherein the first evidence comprises key press data about text keys selected by a user.

13. The computer-implemented method of claim 10, further comprising checking for deletion of at least part of the text selected by the user, and if such a deletion occurs, to storing second evidence comprising identifiers of text characters deleted by the user.

14. The computer-implemented method of claim 10, further comprising observing the second evidence and storing the second evidence, where the second evidence comprises key press data observed during selection of the text by the user in the second attempt at inputting the intended text.

15. The computer-implemented method of claim 10, further comprising assigning weights to the second evidence and aggregating the first and second evidence using the weights.

16. The computer-implemented method of claim 10, further comprising aggregating the first and second evidence on the basis of probability values associated with either or both of the first and second evidence.

17. The computer-implemented method of claim 10, further comprising offering one or more of the predicted text items for input to the computing device.

18. The computer-implemented method of claim 10, wherein original text input by the user that was autocorrected or autocompleted is ranked highest in the plurality of predicted text items.

19. A text input system for inputting text to a computing device, the text input system comprising:
memory storing unrecognized text input by a user to the computing device;
one or more processors programmed to detect second evidence comprising information about autocorrected or autocompleted text deleted by the user down to a common prefix of the unrecognized word;
an input model configured to combine at least the first and second evidence to produce combined evidence; and
a text predictor configured to use the combined evidence to compute a plurality of predicted text items for input to the computing device and rank the plurality of predicted text items based, at least in part, on the autocorrected or the autocompleted text that was deleted by the user, wherein the plurality of predicted text items include the unrecognized text that the user input based on the user deleting the unrecognized word down to the common prefix.

20. The text input system of claim 19, further comprising a display configured to present the plurality of predicted text items, including the unrecognized text that to the user.

* * * * *